2 Sheets—Sheet 1.

J. C. F. SALOMON.

Car Brake.

No. 19,795. Patented Mar. 30, 1858.

J. C. F. SALOMON.
Car Brake.

No. 19,795.

2 Sheets—Sheet 2.

Patented Mar. 30, 1858.

UNITED STATES PATENT OFFICE.

JNO. C. FR. SALOMON, OF BALTIMORE, MARYLAND.

RAILROAD-BRAKE.

Specification of Letters Patent No. 19,795, dated March 30, 1858.

*To all whom it may concern:*

Be it known that I, JOHN C. FR. SALOMON, of Baltimore, in the State of Maryland, have invented a new and useful Improvement in Railroad-Car Brakes; and I do hereby declare that the following is a full, clear, and exact description of the same, reference being had to the accompanying drawings, forming part of this specification, in which—

Figure 1:
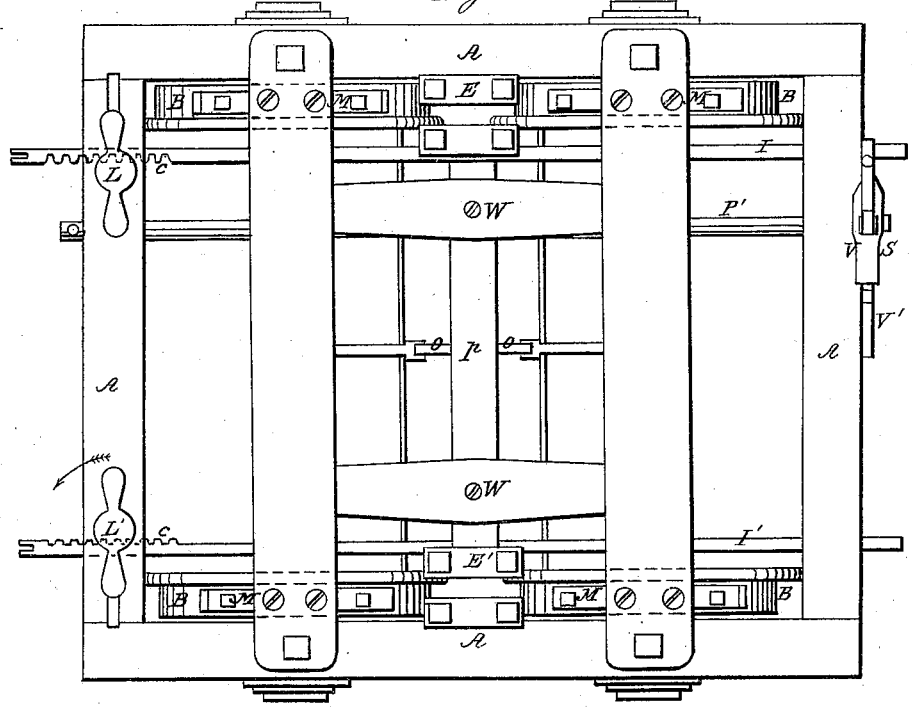
Figure 4:
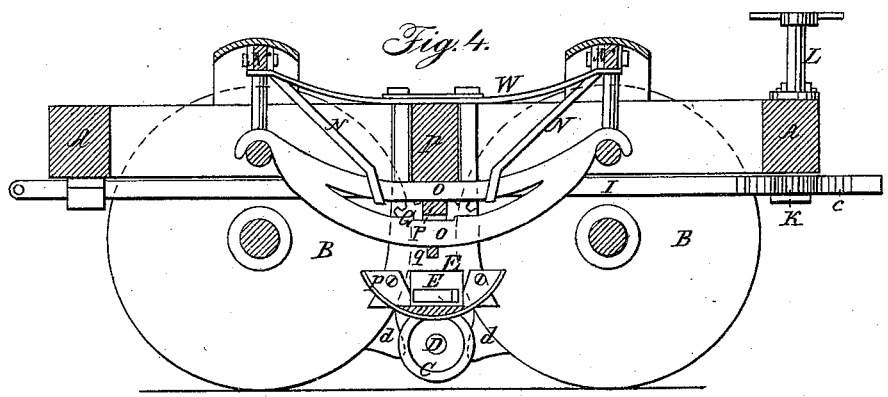
Figure 2:
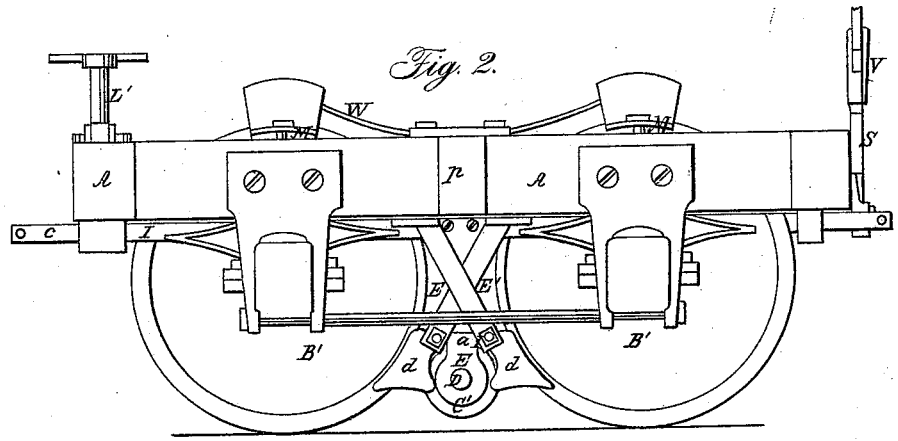
Figure 3:
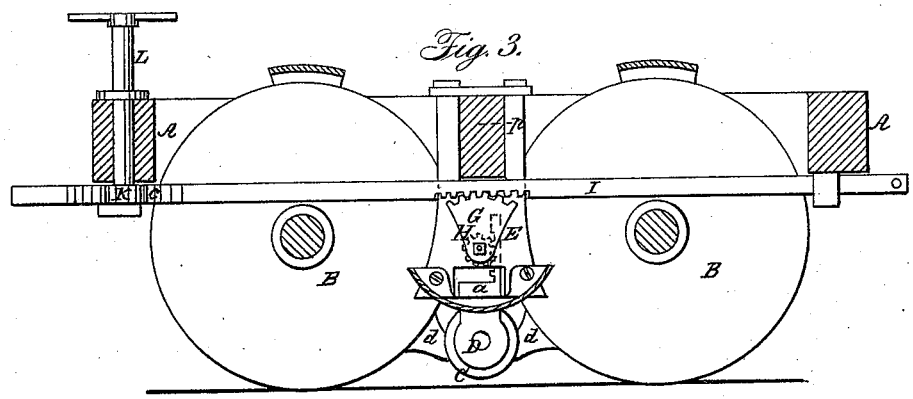
Figure 5:
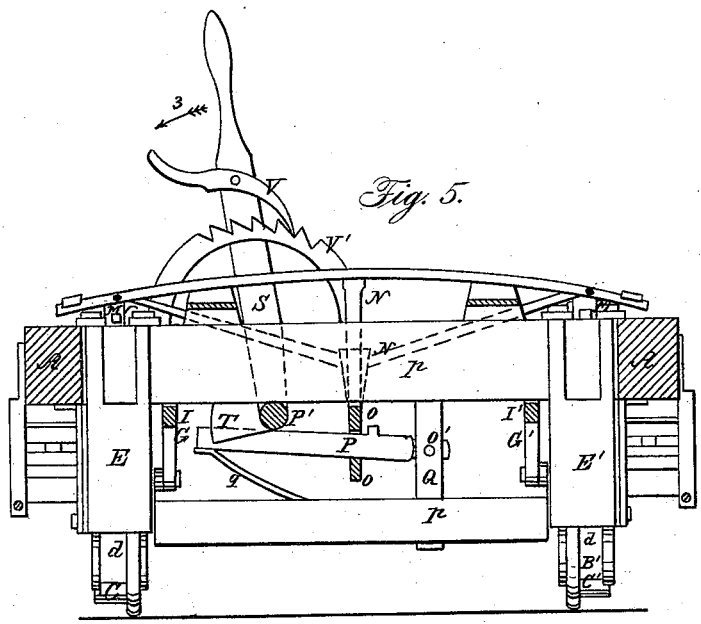

Figure 1 is a plan or top view of a railroad car brake constructed after my invention. Fig. 2, is a side view of the same. Fig. 3, is a vertical longitudinal central section of the same. Fig. 4, is a vertical longitudinal section of the same in the line $x$, $x$, of Figs. 1 and 5. Fig. 5, is a vertical transverse section of the same in the line $y$, $y$, of Figs. 1 and 4.

Similar letters of reference in each of the several figures indicate corresponding parts.

The nature of my invention consists in the employment of small auxiliary wheels between the main wheels of the locomotive and several cars of the train; said wheels being adjustable up and down by means of jack screws, in order when the train is passing around curves to suspend above the rails those wheels which may be in line with the inward or shortest curve of the track, and when said wheels are suspended to perform the office of the same in such a manner, owing to their decreased diameter, as to allow the main wheels of the outward or longest curves of the track to run over a greater length of space in a given time than they themselves run over and thus compensate for the difference in the length between the inner and outer curves of the tranck, said wheels being also adjustable in order that when it is desirable to reduce the speed of the train all the main wheels may be suspended and the train allowed to run on the small auxiliary wheels, and consequently, owing to the decreased diameter of the small wheels, will accomplish the desired object in the most safe and perfect manner.

My invention consists 2nd in the combination with the said auxiliary suspending and compensating wheels of a brake which is peculiarly constructed and arranged to act with a downward pressure upon the upper part of the periphery of the main wheels, so that the brakes may be applied to the main wheels on the outward or longest curve and the speed of the train retarded, even while passing around curves, if necessary; this being safe and practicable with my arrangement owing to the decreased diameter of the small auxiliary wheels not allowing them to travel over a space sufficiently great above that which the large wheels travel with the brakes applied to them to endanger the safety of the train.

To enable others skilled in the art to make and use my invention, I will proceed to describe its construction and operation.

A, represents the truck frame of a car. B, B, B', B', the main wheels. C, C', the small auxiliary wheels they are arranged between the main wheels, being attached by their axles D, D, to the perpendicular portions $a$, $a$, of jack screws E, E', and are made to rise and descend by means of cogged sections G, G, which are on the shafts of the jack screw pinions H, H', and are caused to perform circular vibrating movements by means of horizontal rack bars I, I', which have horizontal teeth $b$, $b$, to gear with the sector teeth and vertical teeth $c$, to gear with pinions K, K', of the vertical windlass shafts L, L', as shown.

The auxiliary wheels C, C', are held in place while elevated, as shown in Fig. 2, by means of curved suspeded blocks $d$, $d$, which are pivoted to the guide boxes of the jack screws and correspond in form, internally to the curve of the small wheels, and externally to the curve of the large main wheels. These blocks also serve as guides and stays to the auxiliary wheels when said wheels are down upon the rails. With this arrangement of auxiliary wheels, it may be evident that by turning one of the windlass shafts L', in the direction of the arrow 1, that the rack bar I', will be caused to move in the direction of arrow 2, the sector G', to turn in the direction of the arrow 3, and consequently the jack screw E', will be caused to descend and carry with it the small auxiliary wheel C', which by coming in contact with the rail of the inward curve will elevate the inner side of the truck frame and the main wheels B', B', above the rails and thus cause the weight of the car to rest upon itself and upon the main wheels B, B. The car thus adjusted and with the auxiliary small wheel C, elevated will be in a condition for running with safety around the curve, as the small auxiliary wheel C', will owing to its decreased diameter allow the large main wheels to travel over as much greater length of space than they themselves travel over as may be necessary to compensate for the difference between the length of rail forming the outer and inner curves.

The brake which I adopt for each car consists of four curved shoes M, M, M, M, one arranged to press on the upper part of the periphery of each main wheel. These shoes are connected together by means of transverse trusses N, N, which are united and supported by an inverted arch O, as shown. The braces and arch rest upon a transverse arm P, which has one of its ends suspended on a spring $q$ and its other end pivoted at O′ to a vertical standard Q which is held in place and supported by transverse beams $p, p$. Above the loose or suspended end of the arm P, a longitudinal turning rod is arranged. This rod P′, extends from end to end of the truck and has a vertical brake up lever S, at one end and a projection or cam T, at the center of its length. The cam T, is grooved so at to receive the loose end of the arm P, on its under side, and the lever S, has a pawl V, pivoted to it, which takes into a ratchet segment V′, and holds the brakes applied to the wheel so as to exert any amount of friction desired. W, W, are springs for throwing the brakes up off the wheels when the ratchet and pawl are thrown out of gear. With this arrangement of brake it may be evident that an equal pressure will be exerted upon all the wheels at the same time, by simply turning the rod P′, in the direction of arrow 3, owing to the cam projection T, acting upon and depressing the pivoted arm P, which is attached to and supports the arch and the trusses to which the brakes are applied. This arrangement of brake is peculiarly adapted for use in connection with the small auxiliary wheels as its shoes do not interfere with said wheels or their up and down adjustment. It is also better, as may be well known than those arrangements of brakes whch press longitudinally and upward against the wheels as it does not strain the springs upon which the axle boxes rest.

What I claim as my invention and desire to secure by Letters Patent, is—

1. The employment of small auxiliary wheels between the main wheels of the locomotive and several cars of the train; said wheels being adjustable up and down, substantially as and for the purposes set forth.

2. The combination with the said auxiliary suspending and compensating wheels of a brake which is constructed and arranged substantially as and for the purposes set forth.

JOHN C. FR. SALOMON.

Witnesses:
G. YORKE AT LEE,
R. W. FENWICK.